United States Patent [19]

Sandoval

[11] Patent Number: 5,000,628

[45] Date of Patent: Mar. 19, 1991

[54] ONE STEP SQUARE HOLE DRILL BIT

[76] Inventor: Erick A. Sandoval, 709 Watermill Dr., Merritt Island, Fla. 32952

[21] Appl. No.: 533,796

[22] Filed: Jun. 6, 1990

[51] Int. Cl.[5] .............................................. B23B 51/08
[52] U.S. Cl. ......................................... 408/25; 144/69; 144/82
[58] Field of Search ...................... 144/69, 70, 82, 83; 408/24, 25, 26, 29

[56] References Cited

U.S. PATENT DOCUMENTS

| 297,013 | 4/1884 | Rothschild | 408/25 X |
| 461,666 | 10/1891 | Charlton | 408/25 |
| 518,262 | 4/1894 | Meggenhofen et al. | 408/25 |
| 1,499,561 | 7/1924 | Stefanich | 408/25 |
| 1,669,423 | 5/1928 | Schmidgall | 408/25 |

Primary Examiner—Steven C. Bishop
Attorney, Agent, or Firm—Richard C. Litman

[57] ABSTRACT

A new square hole cutter is designed so as to be as compact as possible with minimal clearance space between each individual component. The rotating cutting gears are one piece items that attach to a central hub. The drive shaft and central drive gear are disposed through the central hub. The central drive gear is removable by pulling it over the drive shaft, thereby allowing the drive shaft to quickly removed. The whole cutting unit is easily and quickly assembled and disassembled.

4 Claims, 3 Drawing Sheets

ONE STEP SQUARE HOLE DRILL BIT

BACKGROUND OF THE INVENTION

1. Field of the Invention

The present invention relates to drill bits used to form bores and apertures through stock material. This particular drill mechanism is used to form rectangular four sided bores through a piece of material, usually wood, particle board or Fiberglass. Such a device eliminates the necessity of having to cut each individual side with a jigsaw after first drilling a round bore through the material. Such an inefficient method is time consuming and involves a multitude of different tools, including the drill bit, the drill press, the jigsaw and mounts for placing the stock material on for each individual step of the process. The present invention allows the sqaure hole to be formed with one step and using one cutting device only.

2. Description of the Prior Art

Numerous prior art devices disclose tools for manufacturing holes and bores having for straight sides. A list and description of these prior devices follows below.

U.S. Pat. No. 297,013 issued to Rothschild describes a square hole cutter having a central shaft that derives the four rotating cutters. The cutters are constructed from two pieces that screw together. The gearing is disposed completely beneath the frame, which makes it difficult to disassemble easily.

The U.S. Pat. No. 518,262 issued to Meggenhofen et al. discloses an early drill for making square holes. It makes use of four separate milling cutters that are driven by a single rotating shaft. This device is very awkward in the way that it is constructed in that the gearing on the main shaft is not easily disengaged. The shaft is housed within a tube as is the gearing which engages the four cutters. It would be difficult to replace the gearing should some of the teeth wear down or break off.

U.S. Pat. Nos. 1,499,561 and 1,669,423 issued to Stefanich and Schmidgall respectively discloses drills with arbors that have four cutters mounted upon them to produce square holes when a main shaft rotates and advances into the stock material. The individual cutters come in two pieces, making these devices that much more difficult and time consuming to assemble.

All of these prior art devices are rather large with a great deal to open space between components which can make them clumsy to handle. They are also not easy to assemble and disassemble on the spot due to the way in which the components are fitted together. The applicant's new square hole cutter provides a compact, easily disassembled square hole cutter that is easier to use than the previously patented square hole cutters discussed above.

SUMMARY OF THE INVENTION

Accordingly, it is an object of the present invention to provide a square hole cutter that can be completely disassembled into its individual moving parts.

It is one object of the present invention to provide a square hole cutter that has all the individual moving parts attach to a central hub portion.

It is another object of the present invention to provide a square hole cutter that has unitary one piece rotary cutters that attach directly onto the central hub.

It is an additional object of the present invention to provide a square hole cutter that has a central rotation gear that is slidably disposed over the central rotating shaft.

It is a further object of the present invention to provide a square hole cutter that is as compact as possible and leaves little open space in its structure. The components are shaped so as to fit closely together with minimal clearance between each component.

It is another object of the present invention to provide a guide that can accurately align the square hole cutter with the intended area to be cut.

These and other objects of the present invention will become readily apparent upon further review of the following specification and drawings.

BRIEF DESCRIPTION OF THE DRAWINGS

Similar reference characters denote corresponding features consistently throughout the attached drawings.

A DETAILED DESCRIPTION OF THE PREFERRED EMBODIMENT

Figure 1:
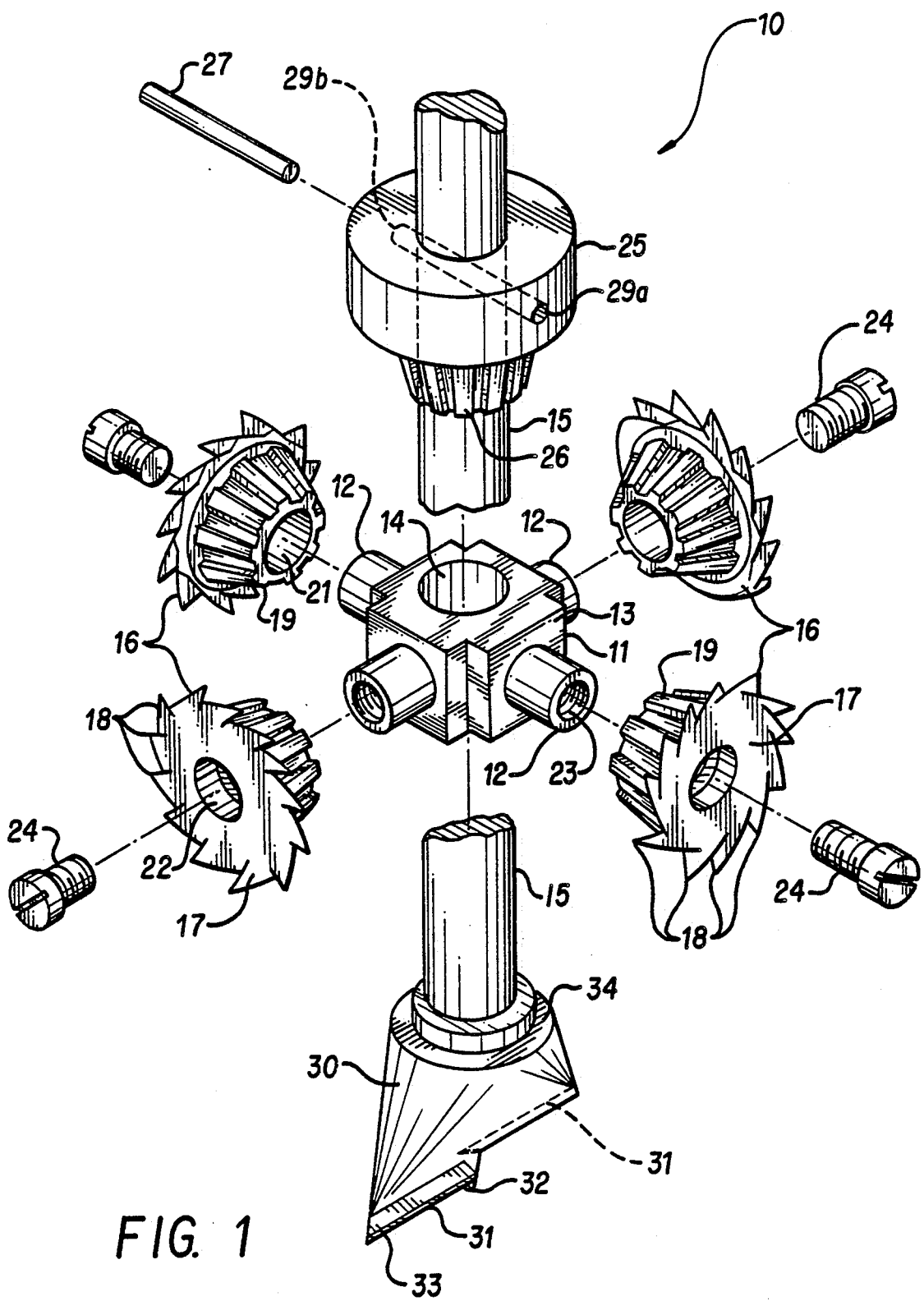
FIG. 1 is an exploded view in perspective of the present invention detailing each individual component of the square hole cutter.

The individual components of the square hole cutter 10 are shown in the exploded illustration in FIG. 1. A central hub 11 has four individual arms or extentions 12 that extend from four separate sides 13 of the hub 11. All four arms 12 lay within the same plane. Disposed in a normal relationship to the four arms 12 is a bore 14 that runs completely through the hub 11. This bore 14 is used to accommodate the drive shaft 15 that drives the cutters 16 as described below.

The cutters 16 each comprise an outer bladed face portion 17 that has a series of sharpened teeth 18 arranged along the outer edge to serve as the cutting means. These teeth 18 can be strengthened by using materials such as Carbide strengthened and hardened metals, which is a technique well known in the art of saw blades and the like for imparting long life to the tools. The rear portion of each cutter 16 is a gear portion 19 that comprises a series of gear teeth 20 disposed along the periphery. The center of the rear portion has a bore 21 disposed through it that extends up to the flat face 17 of the cutter 16. A smaller aperture 22 extends from the flat face 17 to the bore 21.

Bore 21 serves to mount each individual cutter 16 to the hub 11. Specifically, the bore is placed over the individual hub arm 12. There is enough clearance between the hub arm 12 and the bore 21 that the cutter 16 can rotate. The hub 11 and arms 12 can be made from a low friction material such as NYLON, allowing easy rotation of the cutters 16. Such a material can be molded in one piece. The hub arm 12 has a screwthreaded bore 23 placed on the outer end such that when the bore 21 is placed over the arm 12, the screw 24 is then placed through the aperture 22 and then through the threaded bore 23. This serves to hold the cutter 16 onto the hub arm 12. The aperture 22 should be countersunk to present a flat even face 17 when the screws 24 are placed in position. This prevents the exposed screws 24 from marring the flat edge of the hole that is being cut by the cutters 16.

Figure 2:
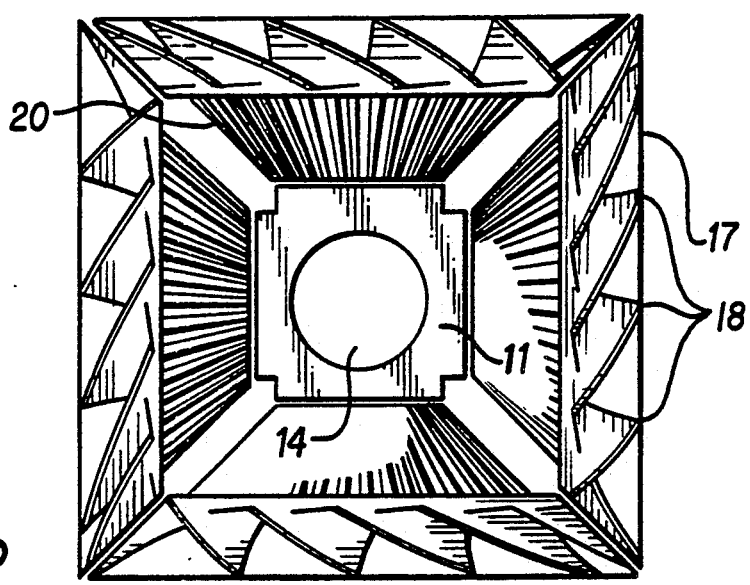
FIG. 2 is a top view of the present invention with the central drive gear removed showing the close fitting between the individual components.
Figure 3:
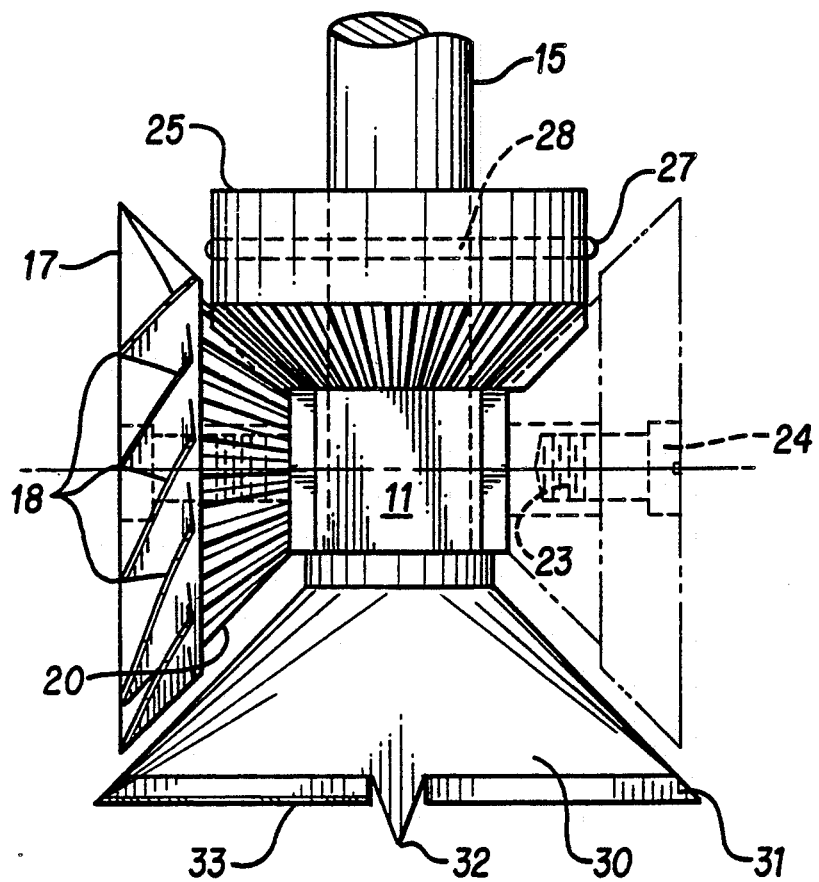
FIG. 3 is a side view in plan section of the present invention.

In FIG. 2 is can be seen how close the cutters 16 are arranged around the hub 11. A minimal amount of space is left between each cutter 16. Disposed on top of the cutters 16 and interengaging with the gearing 20 is the central drive gear 25 having the geat teeth 26 that engage equally with geared portions 19 of the cutters 16. Geared sections 20 and 26 have angles of 45° in relation to the front faces, allowing them to intermesh in a beveled fashion. The closeness of the relationship can be seen in FIG. 3. The central drive gear 25 is held in place on the drive shaft 15 by a pin 27 that fits through a small diameter bore 28 in the drive shaft 15 and a pair of apertures 29a, 29b on opposite sides of the central drive gear 25. This prevents movement of the central drive gear along the shaft and keeps the drive gear 25 engaged with the cutters 16.

At the end of the drive shaft 15 is the initial auger bit 30 that serves to guide the assembly 10 into the work piece. It comprises a pair of flat blades 31 that have been bent in opposite directions and a central point 32 that aligns the auger 30 with the targeted position for the square hole. The blades 31 are sharpened on the bottom edge 33 in order to shave away the work piece material. The top of the auger head 30 has a shoulder 34 that limits the insertion of the drive shaft through the passageway 14. The shoulder 34 and the pin 27 limit the movement of the drive shaft 15 through the bore 14.

Figure 4:
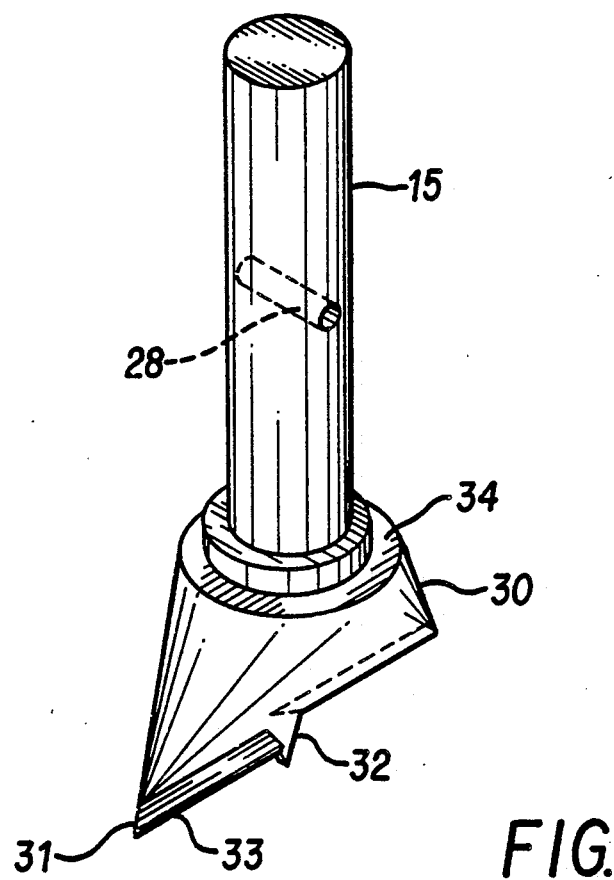
FIG. 4 is a perspective view of the central drive shaft and auger.
Figure 5:
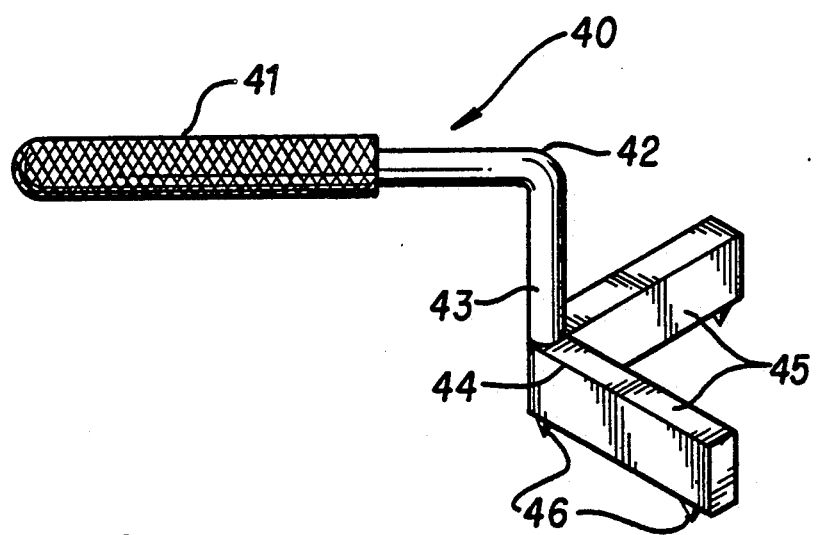
FIG. 5 is perspective view of the guide used in conjunction with the square hole cutter to accurately align the cutter with the intended target area.

Now that the structure of the square hole drill or cutter has been detailed, in use and operation will be explained. A guide 40 is utilized with the square hole cutter 10 to serve as a guide aligning it with the intended target. The guide 40, illustrated in FIG. 4, comprises an elongated handle 41 that bends downward at bend 42. The lower portion 43 of the handle attaches to a guide frame 44 that comprises to perpendicular walled sides 45. Attached to the bottom of each sidewall 45 are a plurality of barbs or points 46 that are used to bite into the work piece material and hold the guide 40 in place. Once the guide 40 is positioned over the intended hole position points 46 are pushed in and the guide is set. Next, the cutters 16 are placed within and adjacent the sidewalls 45 and then are lowered into the work piece to produce the square hole. The upper end of the drive shaft 15 ends in a drill bit shank that is mountable in a standard drill press collet. This allows the square hole cutter 10 to be used with any standard drill press, or any standard hand held drill motor.

It is to be understood that the present invention is not limited to the sole embodiment described above, but encompasses any and all embodiments within the scope of the following claims.

I claim:

1. A square hole cutter including:
    a central hub having four equally spaced radially extending arms disposed about the periphery of said central hub in coplanar manner;
    a centrally disposed bore that passes through said central hub normal to said coplanar arms;
    a rotatable cutter means removably affixed to each said arm, each said cutter means having a distal circular cutting edge normal to said coplanar arms and gear teeth adjacent said central hub;
    a central beveled drive gear disposed atop said rotatable cutter means and engaging said gear teeth of each said rotatable cutter means, said beveled drive gear having a central bore;
    a central drive shaft disposed through said bore of said central hub and through said beveled drive gear;
    said central drive gear having a second bore, normal to and smaller in diameter than said central bore containing said drive shaft;
    said drive shaft having a bore therethrough and normal to the length of said drive shaft; whereby
    when said second small diameter bore of said drive gear and the bore through said drive shaft are aligned, a pin is disposed through said second bore and said drive shaft bore to maintain said drive gear in position along the length of said drive shaft; and
    auger means attached to said drive shaft and disposed below said central hub; whereby
    rotation of said drive shaft rotates said beveled drive gear, said rotatable cutters and said auger to produce a hole having straight edges.

2. The square hole cutter according to claim 1, wherein:
    each said cutter means has a hollow bore into which an individual arm is disposed, said gear teeth being disposed around said hollow bore.

3. The square hole cutter according to claim 1, wherein:
    said auger means comprises a flat blade having a sharpened edge disposed normal to the length of said drive shaft and on the distal end of said drive shaft.

4. The square hole cutter according to claim 1, wherein:
    said drive shaft has a shoulded wider than the internal diameter of said bore disposed through said central hub whereby said central hub sits upon said shoulder and is held in place when said drive gear is held in place along said drive shaft.

* * * * *